W. D. STEWART.
DRAIN OR SEWER-TRAP.
No. 179,138. Patented June 27, 1876.
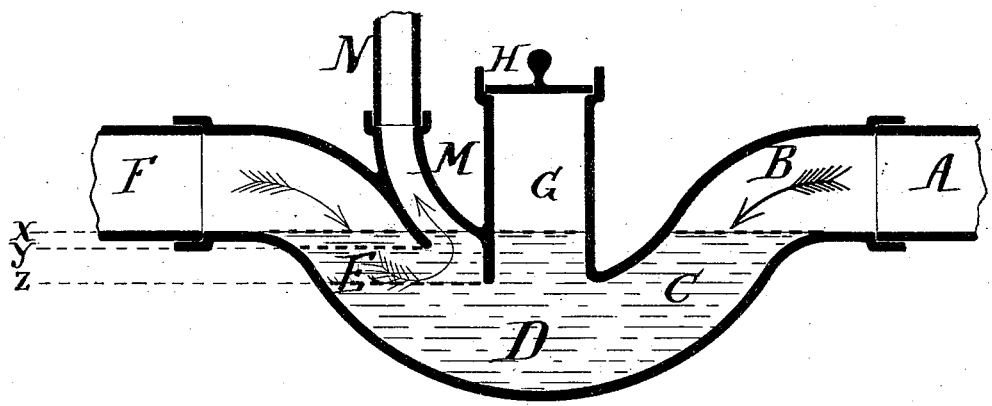

UNITED STATES PATENT OFFICE.

WILLIAM D. STEWART, OF NEW YORK, N. Y.

IMPROVEMENT IN DRAIN OR SEWER TRAPS.

Specification forming part of Letters Patent No. 179,138, dated June 27, 1876; application filed April 10, 1876.

*To all whom it may concern:*

Be it known that I, WM. D. STEWART, of New York city, in the State of New York, have invented certain new and useful Improvements Relating to Drain-Traps or Sewer-Traps, of which the following is a specification:

I am a potter, and prefer to make the trap in one piece of pottery-ware; but some of the advantages may be realized by metal constructions in several pieces.

The novelty lies in a vent-pipe connected at a position where it will vent the gas from the sewer, when under a pressure above the ordinary pressure of the atmosphere, but not sufficient to force the trap.

The following is a description of what I consider the best means of carrying out the invention.

The accompanying drawing form a part of this specification, and is a vertical longitudinal section.

Referring to the figure, B is the end which receives the house-pipe A. There is the ordinary descending part C, the ordinary bottom D, the ordinary ascending part E connected to the drain-pipe F, leading to the sewer. There is also the ordinary hand-connection G with its cover H, by removing which cover access is had to the bottom of the trap, always under water, to allow the clearing away of obstructions. M is a connection which may be of smaller size. It is peculiarly located. It connects to the trap toward the side thereof nearest the sewer, and at a level intermediate between the ordinary water-level when at rest, and the level at which the gas from the sewer would pass the trap and enter the pipe A. Whenever any considerable pressure of gas obtains in the sewer it depresses the water-level in that end of the apparatus, and the gas then begins to vent through the connection M. This connection M is continued by pipes N to lead the gas to a chimney, or a leader, or to any suitable place out of doors, where the gas may blow harmlessly away.

To repeat: when there is no pressure of gas above the ordinary pressure of the atmosphere the trap performs in all respects as usual, and my passage M is of no effect; but if, in consequence of a gale of wind blowing in the mouth of the sewer, a choking of the sewer, the rise of an extraordinary tide in the sewer-mouth, or other cause, the pressure of the gas in the end E is increased, it depresses the level of the water in that end of the trap. The ordinary level of the water in that end is that shown by the dotted line $x$. If the pressure of the gas becomes sufficiently great it will, except for my invention, sink to the dotted line Z, in which position a very little further sinking will send the gas past the trap into the house-pipe A, or what would, in many cases, be still worse, into the hand-hole connection G, whence it could leak into the cellar, and thence permeate the house by flowing through the joint around the cover H.

Now, the effect of my invention is to stop all this by preventing the water-level from ever sinking as low as Z. So soon as the water-level has sunk so low as $y$, which is below the ordinary level, but still much above the level at which it can force past the trap, the gas commences to find a free escape through the vent-passage M and its connections, and continues to flow harmlessly away so long as the pressure continues to supply the poisonous gas.

The pipe from the connection M should, by preference, be a tightly-connected gas-pipe. Any pipe which has reliable tight joints may serve.

I prefer, as above stated, to construct the whole in one piece of pottery-ware, and in such case from the connection M, as shown, so that one side coincides with the main rising part D of the trap, and another coincides with a wall or side of the hand-connection G. This gives great strength, and allows my connection M to be better protected against fracture. It also, I think, economises room.

I claim as my improvement in drain-traps—

1. A vent-passage connected below the ordinary water-level of the trap, but above the level at which gas from the outside can pass, adapted to receive a connected pipe, N, so as to discharge the gas harmlessly therefrom, as and for the purpose specified.

2. The within-described trap formed in one piece, and having the separate connections G M communicating at different levels, as herein specified.

In testimony whereof I have hereunto set my hand.

WILLIAM D. STEWART.

Witnesses:
C. C. STETSON,
JNO. S. DIBBLE.